Dec. 29, 1964    J. F. ATCHISON ETAL    3,163,415
 METHOD AND APPARATUS FOR FORMING AND
        CONVEYING STACKS OF DIAPERS
Filed Sept. 10, 1962    8 Sheets-Sheet 2

Inventors:
James F. Atchison
Robert Steed
Murray H. Hamilton
Attorney

Dec. 29, 1964    J. F. ATCHISON ETAL    3,163,415
METHOD AND APPARATUS FOR FORMING AND
CONVEYING STACKS OF DIAPERS
Filed Sept. 10, 1962    8 Sheets-Sheet 3

Inventors:
James F. Atchison
Robert Steed
Munro V. Hamilton
by
Attorneys

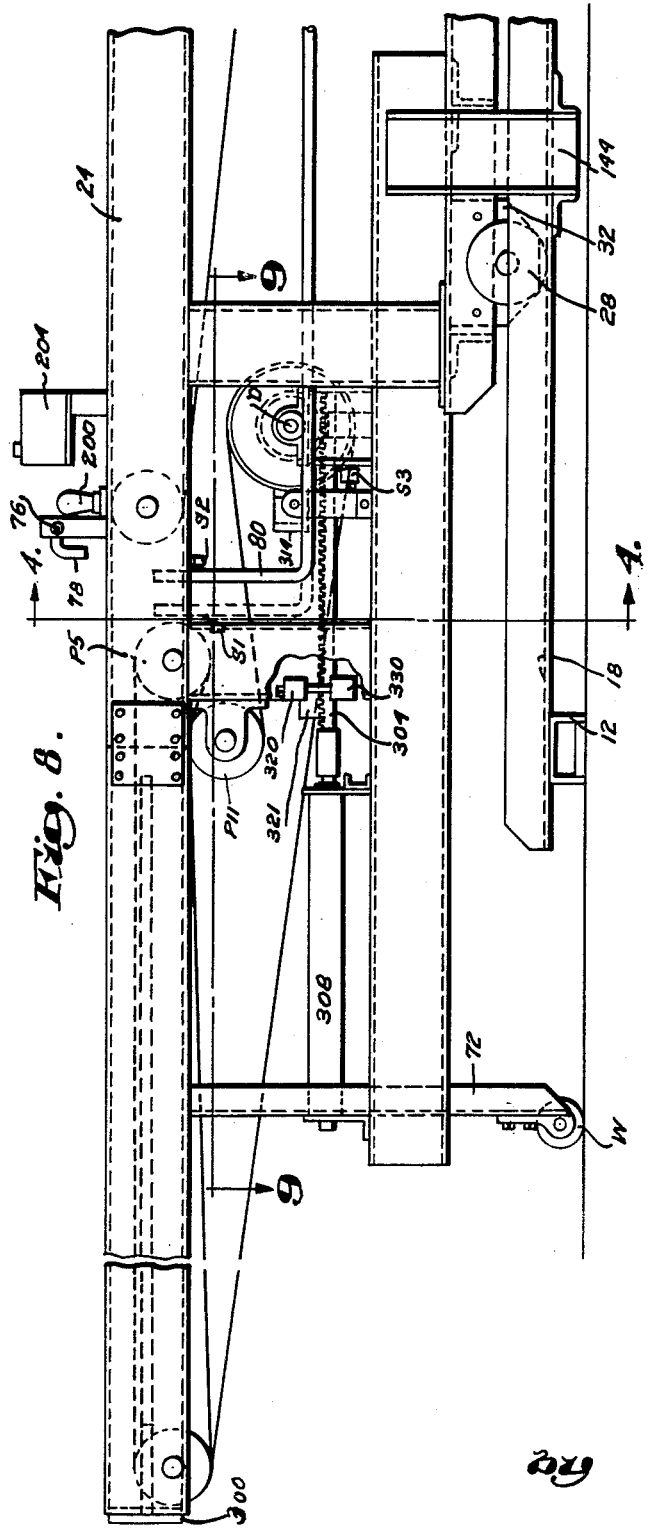

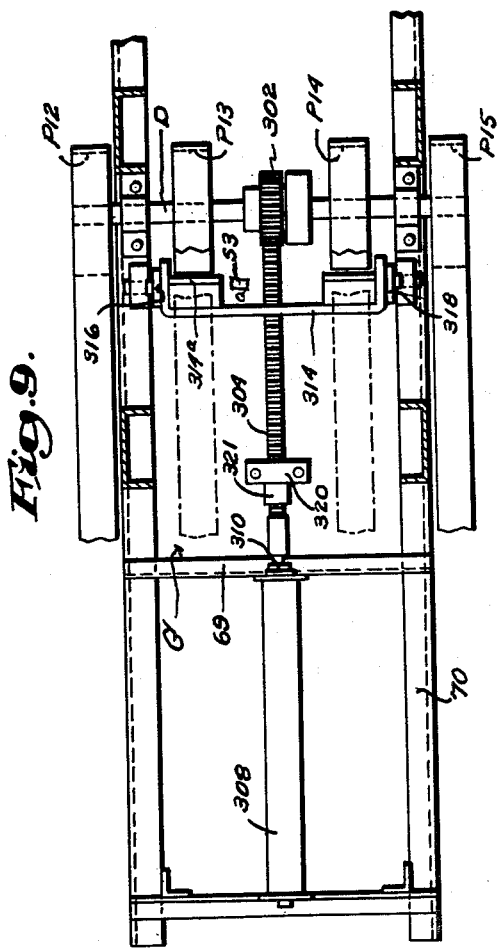

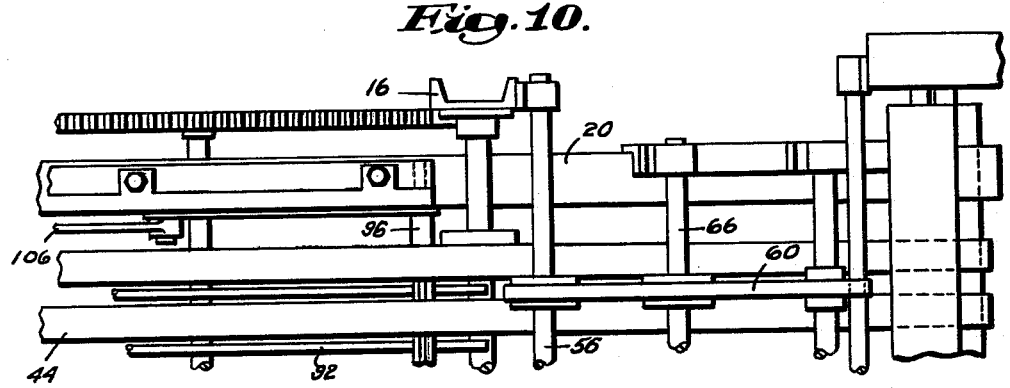
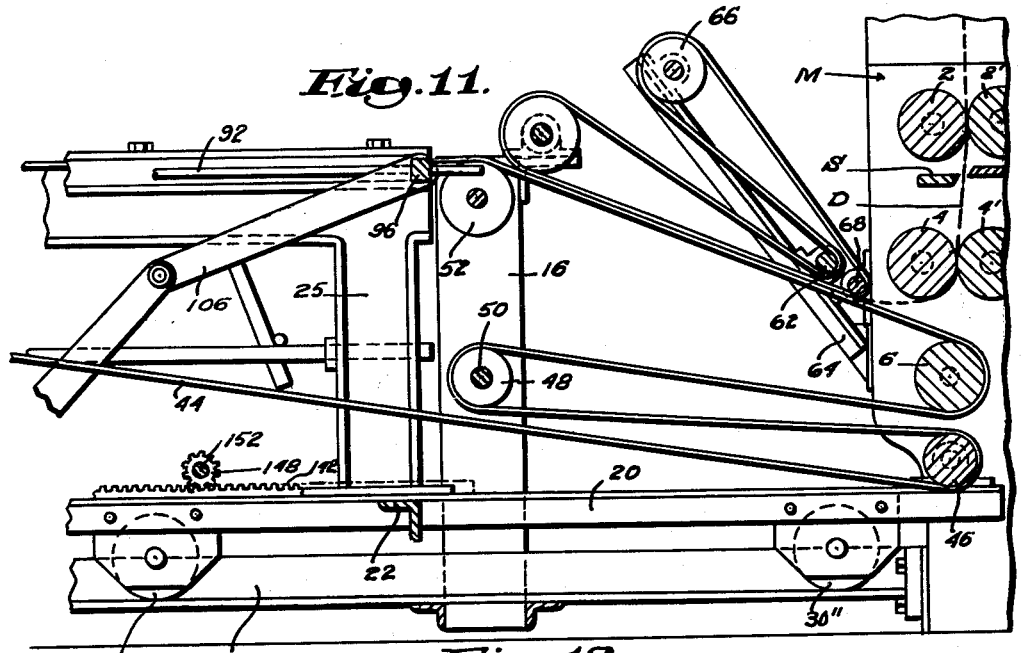
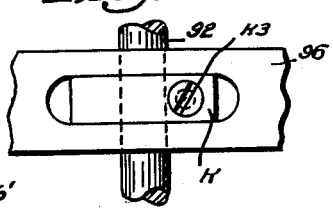
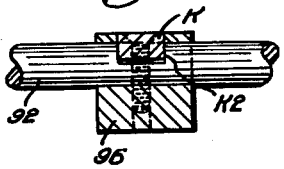
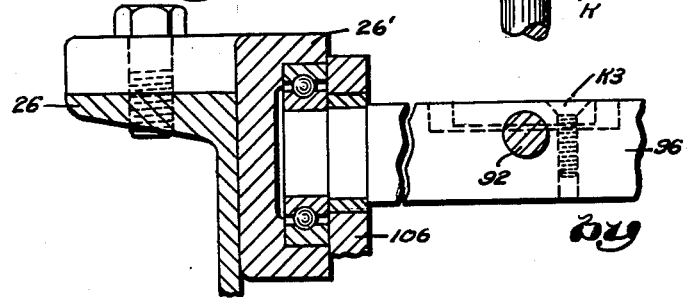

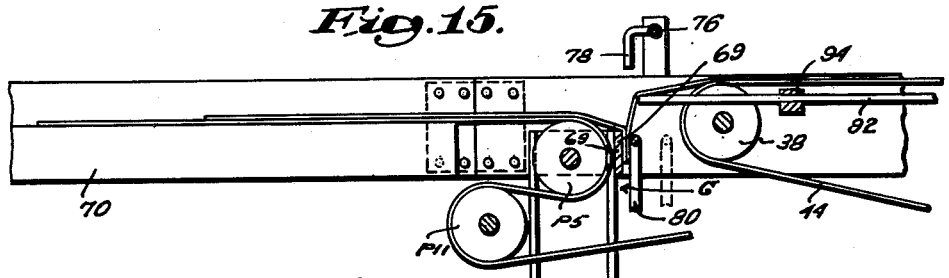
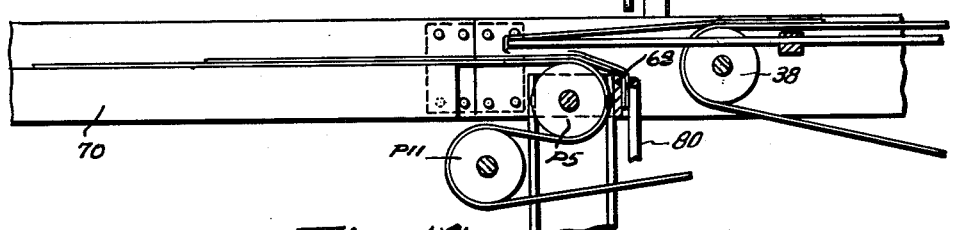
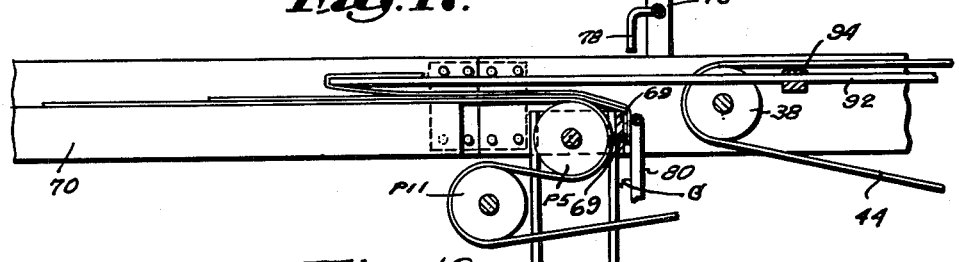
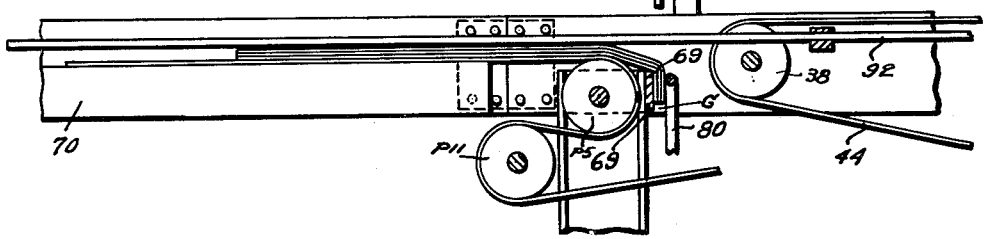

United States Patent Office 3,163,415
Patented Dec. 29, 1964

3,163,415
METHOD AND APPARATUS FOR FORMING AND CONVEYING STACKS OF DIAPERS
James F. Atchison, Philadelphia, Pa., and Robert F. Steed, Fuquay Springs, N.C., assignors to The Millville Manufacturing Co., Millville, N.J., a corporation of New Jersey
Filed Sept. 10, 1962, Ser. No. 222,546
5 Claims. (Cl. 271—68)

This invention relates to a method and apparatus for handling textile materials of the class which are formed with a resin hem or selvage. Textile articles of this class are exemplified by resin hemmed diapers produced in a hemming machine of the type disclosed in Patent No. 2,852,407. This patent is owned by the assignee of the present application and the invention is particularly concerned with handling diapers as they leave the hemming machine in order to arrange a predetermined number of diapers in stacked relationship for facilitating packaging and shipping operations. This application is a continuation-in-part of our copending application Serial No. 96,532, filed March 17, 1961, now abandoned.

The technique of forming diapers and various other cut piece goods with a resin selvage has, in recent years, been introduced and established on a commercially feasible basis by applicants' assignee, and a key factor in the success of this mechanized selvage operation has been a relatively high speed output for producing hemmed diapers, for example, in a finished fully cured state at a rate of approximately thirty (30) to forty (40) diapers per minute. This relatively high rate of output has led to the need for continuous mechanical handling of the finished articles as they come from the hemming machine in order to arrange them in suitable piles or stacks preparatory to packaging and shipping operation.

It is a chief object of the present invention to improve methods and apparatus for handling textile items produced by a resin hemming operation and, in particular, to devise a procedure and mechanism for receiving continuously discharged diapers and arranging them one upon another in stacked relationship on a suitable table or other supporting member and thereafter conveying successive stacks or piles of diapers to a folding and packaging station.

Another object of the invention is to provide a stacking mechanism of the character noted which may be operatively connected to the power driving mechanism of a diaper hemming machine of the class indicated above in Patent No. 2,852,407, whereby each stacking step is carried out periodically in the same time interval required for a single diaper making cycle.

Still another object of the invention is to provide a method of stacking wherein an opportunity is afforded for an operator to inspect and approve each diaper for satisfactory workmanship and condition just prior to the point at which it is stacked.

Still another object is to provide a stacking mechanism which can be adjusted to deal with varying sizes of cut piece goods while still operating with the established period of diaper manufacture of the diaper hemming machine and which will, at the same time, maintain the diaper in a satisfactory flat state without edge turning or other difficulties.

Still another object is to provide a combination of counting and stacking means to produce periodic travel of stacks of diapers in predetermined numbers.

The nature of the invention and its other objects and novel features will be more fully understood and appreciated from the following description of a preferred embodiment of the invention selected for purposes of illustration and shown in the accompanying drawings, in which:

FIGURE 3 is a cross sectional view taken on the line 3—3 of FIGURE 1;

FIGURE 8 is an enlarged fragmentary side elevational view of the machine particularly illustrating the gripper bar mechanism of the invention on a somewhat enlarged scale;

FIGURE 9 is a detail plan view of stack conveying means;

FIGURE 10 is an enlarged fragmentary plan view of conveyor belt mechanism illustrating change in position;

FIGURE 11 is a fragmentary elevational view of conveyor mechanism;

FIGURES 12–14 are detail views of adjustment and locking mechanisms;

Figure 19:
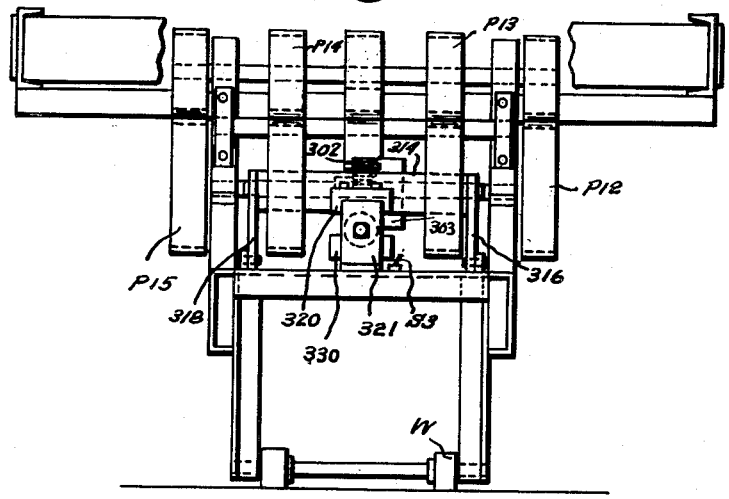

FIGURES 15–18 inclusive, illustrate steps in stacking diapers in accordance with the method of the invention;

FIGURE 19 is an elevational view of air cylinder and stop means; and

Figure 20:
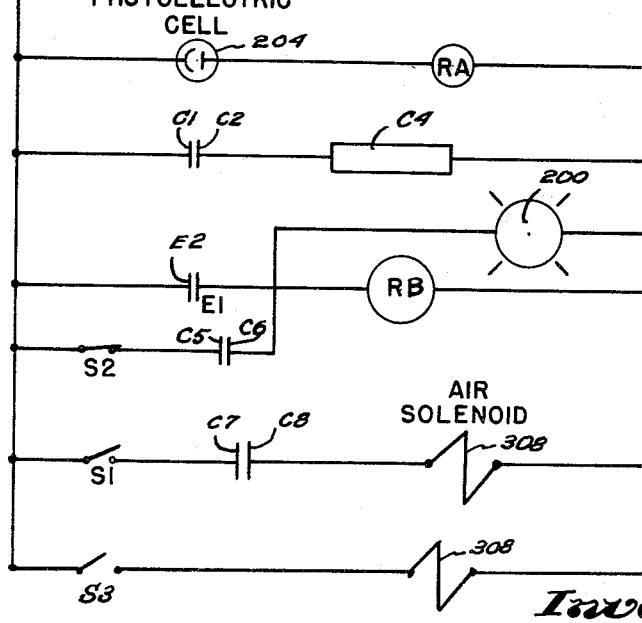

FIGURE 20 is a diagrammatic view illustrating electrical circuit and components employed in carrying out the method of the invention.

In carrying out a stacking and conveying operation which will satisfactorily locate a desired number of hemmed diapers upon one another with their edges in registered relationship and periodically move the stack into a desired packaging station, certain limitations are present. These limitations render conventional types of stacking apparatus unfeasible and necessitate an entirely different method of handling.

To deal with requirements specific to resin hemmed articles, we have devised a novel method of stacking in which successive textile sheets, such as diapers, are overturned as they are conveyed along a horizontal path of travel. In our method gripper means advance and retract periodically to temporarily hold a forward edge of each successive sheet along a transverse line of gripping. While thus held each sheet is turned over into a forwardly extending position so that it comes to rest in superimposed relationship upon an underlying sheet and a stack in some desired number is thus assembled. The stack is then conveyed to a packaging station.

Figure 1:
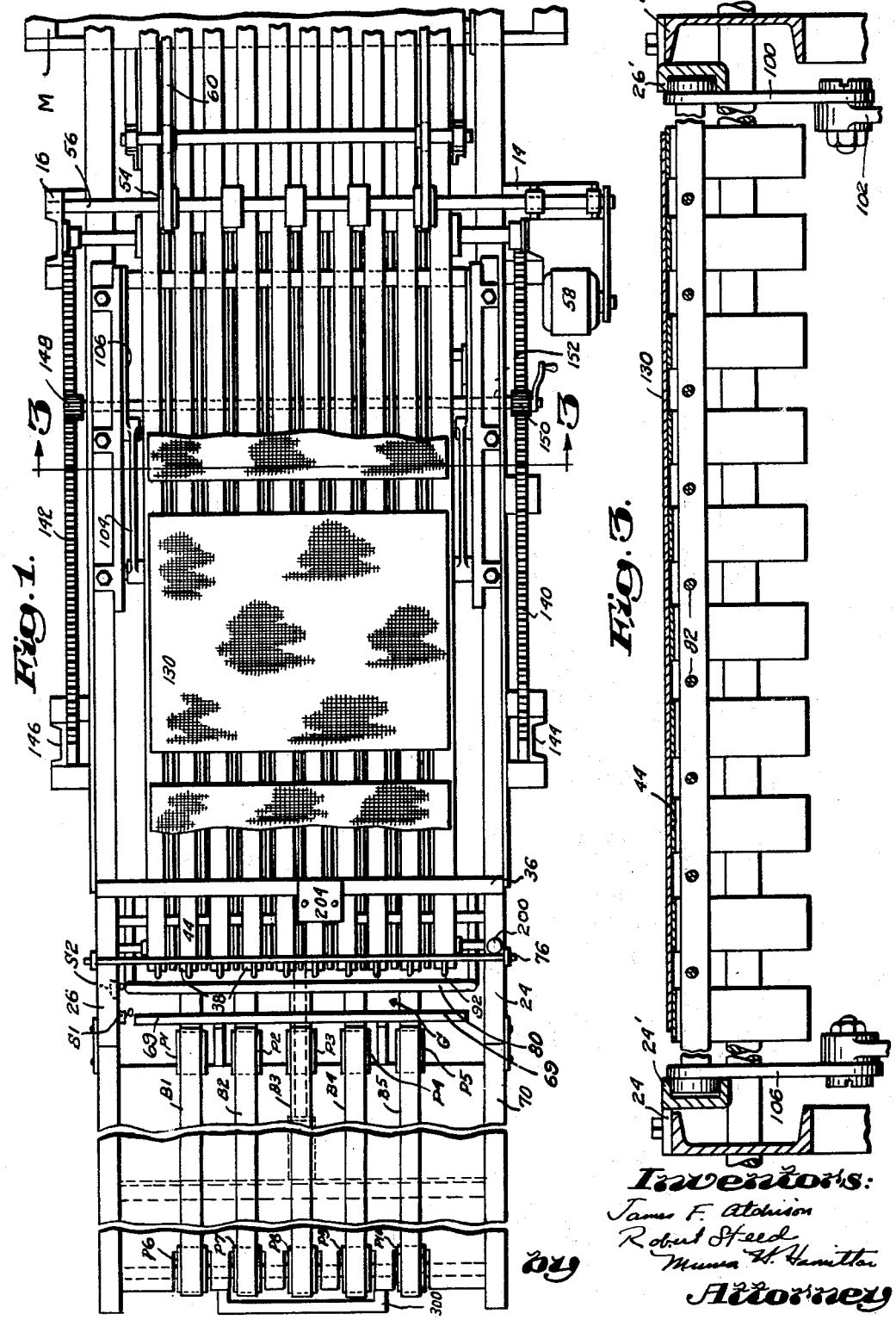
FIGURE 1 is a plan view illustrating the stacking mechanism of the invention shown in an operative position.
Figure 2:
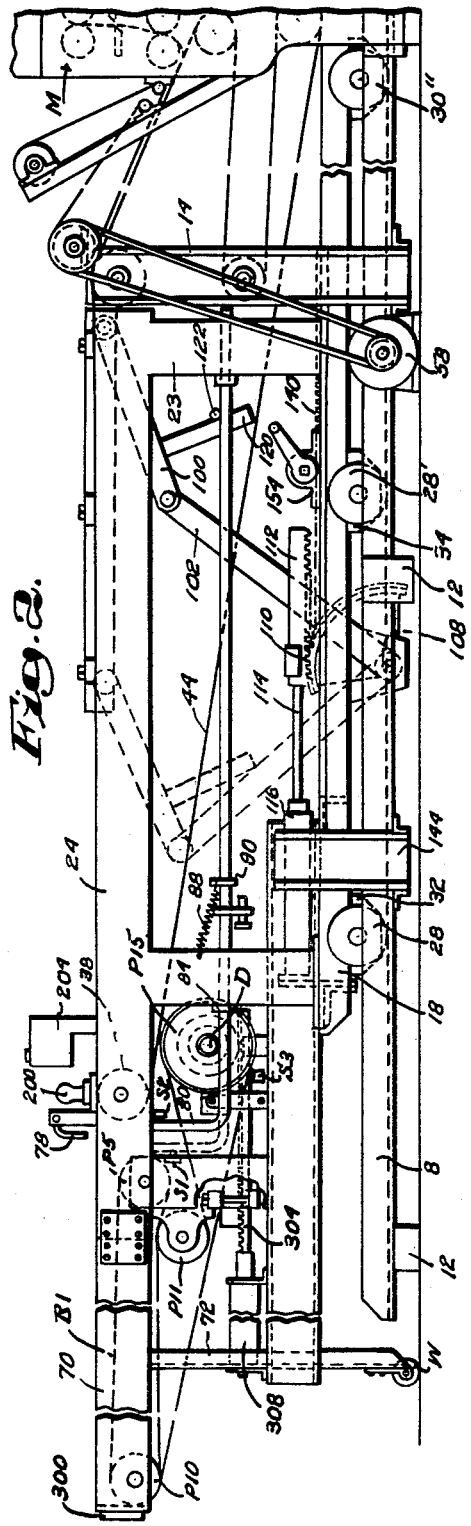
FIGURE 2 is a side elevational view of the stacking mechanism shown in FIGURE 1.

Considering these handling operations in greater detail, attention is directed to FIGURES 1 and 2 of the drawings.

As shown therein, we have illustrated the stacker mechanism of the invention in one preferred arrangement secured in operatively connected relationship with respect to a cloth hemming machine of the type disclosed in Patent No. 2,852,407. As this patented structure is particularly designed for the manufacture of hemmed diapers, the stacking mechanism of the invention will be described having reference to the operation of stacking diapers. However, our stacking method is not limited to the handling of diapers or any other particular item, and may be employed in stacking various other textile items such as wipe-up cloths, napkins, aprons, curtains, towels, table cloths, bed linen, flags, and the like in keeping with the scope of the invention as defined by the appended claims.

A portion of the hemming machine disclosed in the patent above referred to is denoted by the reference character M and has been indicated fragmentarily at the right hand side of FIGURES 1 and 2. Roll components of the machine M are also indicated in FIGURE 11, and include pairs of guide rolls 2, 2', 4, 4', together with power driven rolls 6. The latter rolls 6 operate intermittently in accordance with the diaper forming cycle of the machine M, as set forth in Patent No. 2,852,407, and furnishes a drive for actuating diaper conveyor mechanism of the invention hereinafter described in detail.

In accordance with the invention, we provide a stacking apparatus designed to be attached directly to the output end of the machine M which is shown at the right hand side of FIGURES 1 and 2. This apparatus is made up of conveyor means; a horizontally adjustable carriage for varying the position of the conveyor relative to the machine M, or any other source from which textile items are being delivered; a reciprocating mechanism arranged in the carriage to grip successive diapers and to overturn the diapers into a forwardly extending stacked position; and a special stack conveying mechanism.

Considering these parts in detail, we provide a pair of rail members 8 and 10 occurring in spaced-apart parallel relation and supported on base members 12 and stationary uprights 14 and 16. The rail members 8 and 10 are solidly secured to a base section of the machine M by bolts or other fastenings as shown in FIGURE 11. Mounted on the rails 8 and 10, in rolling contact therewith, is the horizontally adjustable carriage which can be adjusted towards or away from the diaper machine M in order to handle varying sizes of resin hemmed articles which are produced by the machine M.

Included in the carriage structure are elongated sides 18 and 20 which may, for example, be of steel beam construction and which are solidly secured together by cross members as 22. Supported above the side frames 18 and 20 on legs 23 and 25 are channelled frame sections 24 and 26.

The carriage structure described is carried on wheels as 28, 30, 28', 30', 30" supported in bearing members as 32, 34, which are solidly secured to respective sides 18 and 20. The upper sides of the frame sections 24 and 26 may be rigidly held by means of one or more transverse brace members as 36 (FIGURE 1). Between the channelled sections 24 and 26 are located a plurality of spaced-apart pulley members 38 mounted on a shaft 40 rotatably received in bearings 41 and 42. Guided around the pulleys 38 are a plurality of conveyor belts 44 which extend rearwardly and downwardly to a rear section of the carriage as shown in FIGURE 11.

Figure 4:
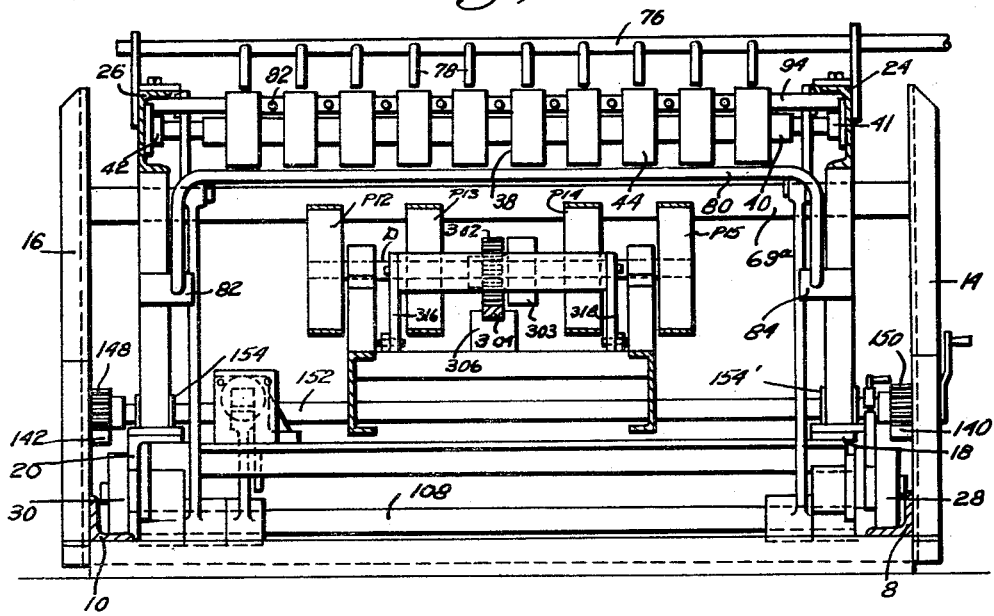
FIGURE 4 is an end elevational view of the stacker mechanism.

The rear section of the carriage is supported on another pair of wheels as 30" and extends for a short distance underneath the rolls 6 of machine M, as noted in FIGURE 10. This rear carriage section serves to adjustably position a lower set of pulleys 46 around which the belts 44 are guided and returned to another set of fixed pulleys 48 (FIGURE 11). Pulleys 48 are mounted on a shaft 50 transversely disposed between the two stationary uprights 14 and 16 rigidly secured at either side of the bare frame as shown in FIGURE 4. From the pulleys 48 the belts 44 are guided rearwardly around the power driven rolls 6, as indicated in FIGURE 11, then upwardly along an inclined path over pulleys 52 and then along a horizontal path to the first above-noted pulleys 38.

It will be observed that the conveyor belts 44 as they leave the rolls 6 are thus in a position to receive and carry upwardly a textile item such as a diaper from the machine M. In FIGURE 11 a diaper is indicated by the letter D in a position just prior to its being cut off by shears S of machine M.

It is frequently found that diapers thus picked up and moved along an inclined path of travel are subject to their formed edges rolling or becoming turned over. Therefore, it becomes necessary to protectively hold the diaper during this part of its travel.

To accomplish this function, we provide a second conveyor mechanism which comprises another set of pulleys individually supported and including pulleys 54 adjustably supported as shown in FIGURE 10 on a shaft 56. This shaft is driven by a motor 58 mounted at one side of the machine as best shown in FIGURES 1 and 2. The pulleys 54 have received therearound belts 60 which extend rearwardly about adjustable pulleys 62 secured in a pulley bracket 64. From these pulleys 62 respective belts pass to fixed pulleys 66, as shown in FIGURE 11 and then around another set of stationary pulleys 68.

It will be observed that the arrangement of the belts 60 is such that they travel in contact with adjacent belts 44 of the first described conveyor. By means of this arrangement, therefore, it will be apparent that a textile sheet such as a diaper may be firmly gripped and held therebetween in a fully flattened position so that during the initial period of travel the edges of the diaper are held down in a confined position and are thereafter correctly located as they advance onto the horizontal sectional frame members.

Forward travel along the horizontal path referred to occurs over a distance of several feet and is designed to afford an opportunity for an operator to inspect each diaper as it moves along and thus detect and cast out any defective diapers which may come from the machine M.

At a predetermined point in the forward travel of the diapers along a horizontal path across the carriage, we provide means for a forward edge of each diaper being turned into a downwardly suspended position and we further provide means for periodically gripping the suspended edge. During the period that the gripper means is engaged with any one diaper, we also provide means for overturning the free portion of that diaper and advancing this free portion into a forwardly extending position relative to the gripper means. The gripper means includes two separate parts. One part consists in a transverse backing member 69 resting on a stack conveyor 70 supported by legs 72 as shown at the left hand side of FIGURE 2. The second part consists in a reciprocating U-shaped gripper bar mechanism 80. The legs 72 are mounted on wheels W so that the stack conveyor may move with the main carriage when an adjustment is made. It is also pointed out that the backing member 69 is arranged in slightly spaced relation to the pulleys 38 to define a vertical guideway G.

Into this vertical guideway G described, a forward edge of a diaper is, in accordance with the invention, deflected by means of an air jet device, for example, comprised by a conduit 76 connected to a source of compressed air. Extending downwardly from this conduit 76 are a plurality of jets 78 which direct jets of air against an edge of a diaper leaving the forward pulleys 38 so that this edge immediately assumes a vertically depending position as has been suggested in FIGURE 15.

The gripper bar 80 is designed to move forwardly, as soon as the diaper edge assumes the vertically depending position described, and force the diaper edge against the backing member 69 so that this portion of the diaper is securely held. As may be readily seen from an inspection of FIGURE 4, the gripper bar consists of a U-shaped member arranged to extend transversely across the machine and formed with rearwardly extending horizontal legs which are slidably guided in bearings as 82, 84 and 86.

Spring means 88 (FIGURE 2) attached between the carriage uprights and lug means 90 normally urge the gripper bar into engagement with the member 69. Movement of the gripper bar away from the member 69 is controlled by the stacking finger mechanism earlier noted. This mechanism includes a plurality of spaced fingers or rods 92 which are horizontally disposed at the top of the carriage and slidably received through a fixed guide 94 transversely suspended between the sides of the carriage as shown in FIGURES 4 and 12–18 inclusive. The rear extremity of the stacking bars are detachably secured to a movable guide 96 in the manner indicated in FIGURES 11–13. The guide 96 is formed with rod openings in which the rods are held by a key and slot arrangement. K denotes a key which is located in a slot K2 in the rod 92. Loosening the screw K3 allows the key to be withdrawn and the finger to be removed from the guide 96. The guide 96 is arranged for reciprocating travel in the channelled sections 24' and 26', as shown in FIGURE 3 and is actuated by means of linkages 100, 106 attached to opposite sides of the guide 96 as shown in FIGURES 2 and 11. These linkages are in turn adapted to be pivotally moved by means of a rack and gear mechanism and are also designed to control movement of the gripper bar 80.

Considering these linkages in greater detail, numerals 100 and 102 denote one pair of links and numerals 104, 106 denote a second pair. Each pair is pinned at intermediate points and is fixed to respective opposite ends of a shaft 108 in the base of the carriage. Fast on shaft 108 is segment gear 110 in mesh with a rack 112. The rack 112 is connected to a plunger 114 of an air cylinder 116 secured in the base of the carriage at one side thereof as shown in FIGURES 2 and 4. During each diaper making cycle of machine M, the air cylinder operates to retract the rack 112 and turn gear 110. This in turn advances the guide 96 and fingers 92. At the same time the linkage operates through a holding arm 120 and a stop 122 to release the gripper bar so that it may be drawn towards the member 69 in response to the pull spring 88. These movements are controlled so as to occur in timed relationship to one another and provide for the gripper bar first engaging the diaper against the edge 69, and immediately thereafter the stacking fingers contact the underside of the diaper and turn this member over into a forwardly extending position.

Successive handling steps are illustrated in the drawings. In FIGURE 1, we have illustrated a diaper 129 which has already been placed on the frame 70. Numeral 130 illustrates another diaper as it is advanced along a horizontal path of travel by the conveyor mechanism just before it becomes engaged in the gripper bar.

FIGURE 15 shows a diaper 132 at a point at which its forward edge has been deflected by the air blast into a depending vertical position and the fingers 92 are just coming into contact with the underside of the diaper. FIGURE 15 illustrates the gripper bar 80 in a position to jam or clamp the diaper edge against the member 69 and with the fingers 92 beginning to overturn the diaper. FIGURE 17 shows a further point in advancing diaper 132 onto the stack conveyor R. FIGURE 18 indicates a series of diapers arranged in stacked relation in accordance with the invention.

A further important feature of the invention is a stack conveyor apparatus earlier referred to and designed to periodically advance a number of diapers piled one upon another in some predetermined number to an operator packaging station. This packaging station is at the end of the machine and is indicated diagrammatically by end plate 300, shown in FIGURE 2.

The stack conveyor apparatus includes a system of pulleys and belts, together with electro-pneumatic means responsive to movement of the clamp 80 for selectively operating the pulleys at definite intervals determined by the number of diapers desired to occur in a given stack. Considering this stack conveyor apparatus in detail, conveyor belts B1, B2, B3, B4 and B5 are supported around an inner set of pulleys P1, P2, P3, P4 and P5; an outer set of pulleys P6, P7, P8, P9 and P10; an intermediate set of pulleys of which one pulley, P11, is shown in FIGURE 2; and finally a set of intermittent drive pulleys P12, P13, P14 and P15.

The four pulleys P12, P13, P14 and P15 directly drive the four belts B1, B2, B4 and B5, together with the other pulleys noted. The fifth belt, B3, is supported solely around the pulleys P3 and P8 and moves with the other belts. The drive pulleys P12, P13, P14 and P15 are fixed on a shaft D which, as shown in FIGURE 9 also has centrally received thereon a gear 302. The gear 302 is adapted to engage with a clutch member 303 and gear 302 turns the clutch in one direction only when a rack 304, shown in FIGURE 9, is extended.

The rack 304 is guided in a channelled part 306 (FIGURE 4) and is periodically reciprocated by means of a fluid pressure actuated cylinder 308 to which an end of the rack is attached as noted at 310. When the cylinder 308 is actuated in one direction and its plunger extended, the rack turns the gear 302 and through the clutch 303 rotates the drive pulleys P12, P13, P14 and P15 and causes the belts to travel from right to left as viewed in FIGURE 1. The rack is extended in this manner a sufficient distance to advance the stack of diapers into close proximity to the operator packaging station at the member 302.

Rotative movement of the drive pulleys P13 and P14 is checked at the end of travel of the rack member 304 by means of a brake device consisting of a brake shoe 314 which is supported on pivoted arms 316 and 318 as shown in FIGURE 4. The brake shoe is fitted with brake liner surfaces 314a and 314b which are adapted to engage with the peripheral surfaces of the driving pulleys P13 and P14 as suggested in FIGURE 9 when the brake shoe is pivoted forwardly by a projecting part 320 on a bracket 321 fixed to the rack 304 and arranged to come into contact with a rear surface of the brake shoe at the end of the travel of the rack into a fully extended position. Movement of the rack 304, by means of the pneumatic cylinder 308, is controlled by electrical circuit means illustrated diagrammatically in FIGURE 20. This circuit is responsive to movement of the clamp member 80 through two limit switches S1 and S2; and also to movement of the rack 304 through a limit switch S3; and the circuit is further periodically energized by a diaper counting mechanism. The limit switches S1, S2 and S3 are indicated at the lower left hand side of FIGURE 20. Switches S1 and S2 are also shown in FIGURES 1, 2 and 8 secured in the machine frame in a position to be periodically engaged by the reciprocating clamp 80 as suggested by the dotted line position of the clamp in FIGURE 8.

Limit switch S1 is normally open when depressed as occurs when the clamp 80 is in a forwardly extended diaper clamping position. When the clamp is retracted, switch S1 closes completing a circuit through the air solenoid of cylinder 308.

Limit switch S2 is normally closed when the clamp 80 is moving toward and away from a diaper clamping position and becomes opened only at the point at which the clamp 80 reaches a fully retracted position. When thus opened, switch S2 interrupts the circuit through the air solenoid of cylinder 308.

Limit switch S3 is mounted centrally of the machine in the path of travel of a lug portion 330 on the bracket 321 of rack 304, as suggested in FIGURES 8 and 19, and also shown in FIGURE 2. Limit switch S3 is normally open and is only closed when the rack 304 has reached the end of its outward travel. Closing of switch S3 completes a circuit through the air solenoid and a valve arrangement of conventional nature for causing the cylinder plunger to retract.

As indicated in FIGURE 20 a photo electric cell 204 acts through a relay RA to close contacts C1, C2 and store impulses in a counter device C4. The photo electric cell is mounted on the machine frame, as suggested in FIGURE 2, in a position such that each time a diaper is advanced toward the gap G it interrupts a beam of light and operates the relay RA thus causing the contacts C1, C2 to close and thereafter an electrical impulse is stored in the counter C4 which may, for example, be of the conventional decade type.

In one preferred form of the invention, it may be desired to assemble and package a stack of six diapers, although it should be understood that the invention is not limited to this or any other number of diapers, but may be employed with other numbers of diapers or other textile sheets.

At the point at which, for example, a sixth diaper interrupts the beam of light through the photo electric cell 204, the clamp 80 is in a retracted position and the air cylinder is not operating. Interruption of the light beam by the sixth diaper moving across the beam closes relay RA which in turn closes the contacts C1 and C2 sending impulses to the counter C4 which is set to energize its output relay coil at this number. The output relay coil in the counter then closes contacts E1, E2 which energizes RB. RB closes contacts C5 and C6 and also contacts C7 and C8.

Since contacts E1, E2 are closed by a momentary impulse from the counter, the contacts C5 and C6 hold the circuit latched for the coil of relay RB and signal lamp 200 until such time as limit switch S2 opens to break the circuit. Since contacts C7 and C8 are closed at this time, a circuit is completed through the air solenoid of the cylinder 308 when limit switch S1 is closed by the clamp 80 starting to retract. This operates the rack 304 and the driving pulleys P12, P13, P14, P15 are rotated and the stack of diapers on the belts B1, B2, B3, B4 and B5 is advanced.

As the rack reaches a fully extended position and closes limit switch S3 which causes the air cylinder plunger to become retracted, thereafter a succeeding diaper enters the gap G after starting a new cycle of impulses in the counter C4 and clamp 80 moves ahead to open switch S2 and discontinue further operation of the air cylinder until another stack of six diapers has been assembled and counted by the counter C4.

It will be observed that an efficient and continuous handling of stacks of diapers or other sheet materials may be carried out in this way with the number of items in the stack being varied at will by adjusting the counter and there is no interruption in the forward travel of successive diapers being delivered from the portion of the machine which cuts and hems these articles.

As suggested above, the stacker mechanism described is adapted to be adjusted so as to handle a range of sizes of articles to be stacked and an important feature of the invention is the movable carriage arrangement which is particularly designed to carry out such an adjustment. It is pointed out that in a stacking operation of the type disclosed the stacking time interval for handling each diaper is determined by the output rate of machine M. Therefore, a change in size of the product means a change in the distance at which the stacking mechanism is spaced from the machine M and this in turn may involve a change in the position of the various pulleys and belts.

Figure 5:
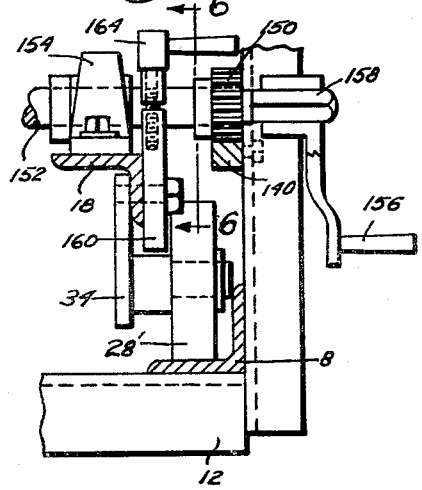
FIGURE 5 is a detail cross sectional view of adjustable mechanism for varying the capacity of the machine.
Figure 6:
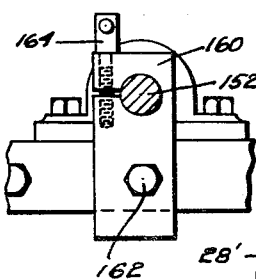
FIGURE 6 is a cross sectional view taken on the line 6—6 of FIGURE 5.
Figure 7:
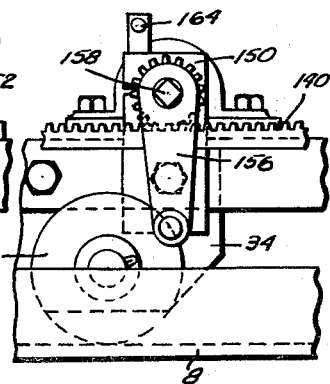
FIGURE 7 is still another fragmentary elevational view of locking and adjustment mechanism.

As one desirable means of adjusting the movable carriage, we provide a dual rack and gear arrangement which is conveniently operated by means of a hand crank. As shown in FIGURES 1 and 4, a pair of elongated racks 140, 142 are securely mounted at either side of the machine between uprights 14 and 144, and uprights 16 and 146 respectively. A pair of gears 148, 150 engage with these racks and are supported at opposite ends of a shaft 152 rotatable in bearing members as 154, 154' fixed to respective sides of the carriage as shown in FIGURE 4. At one end of shaft 152 is a hand crank 156 secured on square end section 158. By turning the crank 156 the carriage may thus be moved along the racks 140, 142 to any desired point of adjustment. In order to maintain the carriage in any one position of adjustment, we further provide a special clamping device consisting of a split clamping block 160 which is bolted to the carriage as shown in FIGURES 5, 6 and 7 by threaded member 162 and which has received therethrough the shaft 152. A locking bolt 164 is threaded in two split portions of the clamping block as shown in FIGURE 6 and can be tightened at any desired setting of the carriage to lock this member in a fixed position.

Movement of the various pulleys into new positions of adjustment is carried out simultaneously with adjustment of the carriage. This may be more readily observed by an inspection of FIGURE 11. As shown therein rolls 48, 6 and 68 are stationary. Rolls 46, 62, 52, 54 are movable in their mountings. With this adjustable mounting the two sets of rolls may be positioned in a correct spacing to properly support the belts for any size of article. At the same time this arrangement provides for maintaining constant belt tension and belt length which saves time and keeps the machine operating satisfactorily.

Having thus described our invention what we claim is:

1. In a method of arranging sheets of material in stacked relationship upon one another in which successive sheets are delivered to conveyor means, engaging the front edge of each sheet at upper and lower sides thereof to maintain said front edges in flattened positions on the conveyor means, the steps which include advancing each of the sheets along a horizontal path of travel in spaced relation, turning a forward edge of each of said sheets into a vertically depending position, and then overturning successive sheets while gripped at two sides along respective vertically depending portions thereby to arrange a plurality of sheets whose rearmost extremities are arranged in aligned vertically depending relationship to one another and also in superimposed registered relation to one another and periodically advancing the superimposed sheets while in stacked relation.

2. In a method of handling sheets of hemmed material in which a continuous web of material is subjected to a resin hemming operation and successive sheets of hemmed material are delivered at a predetermined rate to a conveyor, the steps which include engaging the forward edge of a first sheet at top and bottom sides thereof, maintaining said edge in a uniformly flattened position on the conveyor means, advancing said sheet along a horizontal path of travel, turning a predetermined portion of the front edge of said sheet into a vertically depending position, gripping the vertically depending portion at two opposite sides and simultaneously overturning the sheet while in a gripped position, then advancing successive sheets in a similar manner to provide a predetermined number of sheets which occur in superimposed relationship and whose rearmost edges are aligned with one another and disposed in a vertically depending position, and then conveying the stack of sheets to a packaging station.

3. A stacking mechanism for sheets of textile material comprising a base, a carriage supported on the base, a crank-operated gear and rack mechanism for moving the carriage horizontally along the base into desired positions of adjustment, a conveyor apparatus including a plurality of conveyor belts and supporting pulleys for conveying sheets of material along a horizontal path of travel in the stacking mechanism, a horizontal stacking table secured at one end of the carriage, a gripper bar resiliently supported in rolls arranged in close proximity to the stock, a stacking finger unit mounted for reciprocating movement on the carriage and adapted to stack sheets in a horizontally disposed position one upon another, means included in the stacking finger unit for controlling the position of the gripper bar, an actuating linkage connected to the stacking finger unit, segmental gear mechanism for pivoting said actuating linkage, air cylinder and plunger means for causing a change in position of the segmental gear mechanism, and means for periodically energizing the air cylinder means.

4. A structure according to claim 3 including means for adjusting the conveyor belts in accordance with change in position of adjustment of the movable carriage.

5. A structure according to claim 3, said stacking table and gripper bar including air jet means for vertically positioning an edge of a sheet of material against the stacking table as it moves into position to be engaged by the gripper bar.

References Cited in the file of this patent

UNITED STATES PATENTS

| | | |
|---|---|---|
| 2,754,113 | Sjostrom | July 10, 1956 |
| 2,754,119 | Morgan et al. | July 10, 1956 |
| 2,904,334 | Cundall et al. | Sept. 15, 1959 |
| 2,993,693 | Buss et al. | July 25, 1961 |